United States Patent Office 3,801,587
Patented Apr. 2, 1974

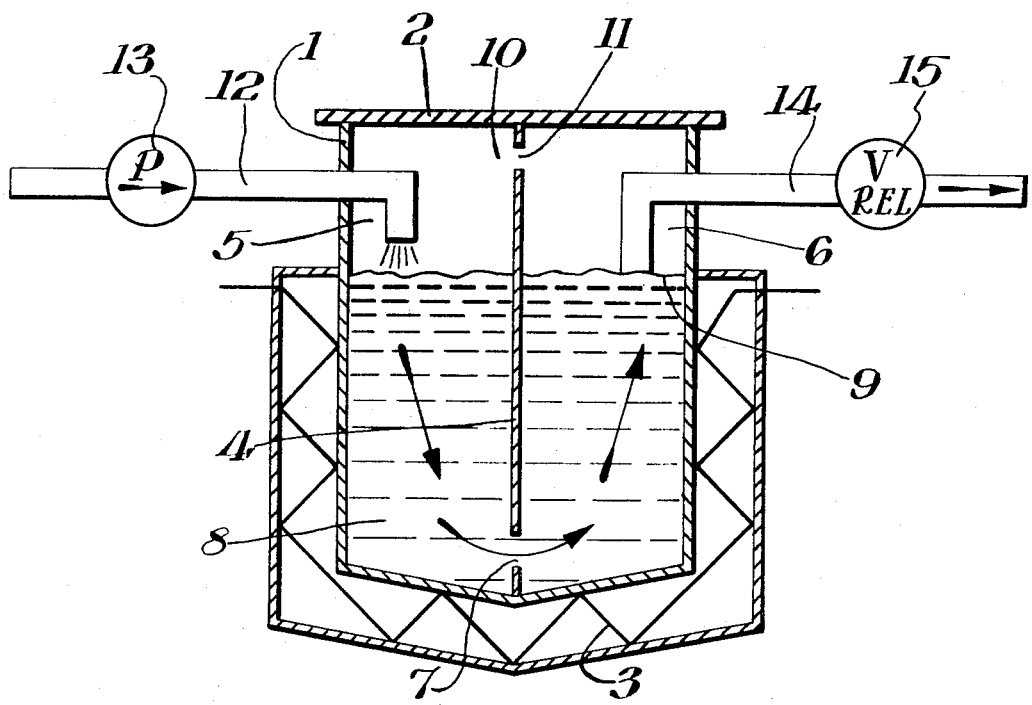

3,801,587
PROCESS FOR THE PREPARATION OF 2-(4-AMINO-PHENYL)-6-METHYL-BENZOTHIAZOLE
Walther Loewe, Bergen-Enkheim, and Karl-Heinz Cossmann and Ernst Meyer, Frankfurt am Main, Germany, assignors to Cassella Farbwerke Mainkur Aktiengesellschaft, Frankfurt (Main) Fechenheim, Germany
Filed Feb. 7, 1972, Ser. No. 224,105
Claims priority, application Germany, Feb. 10, 1971,
P 21 06 200.0
Int. Cl. C07d 91/44
U.S. Cl. 260—304  7 Claims

ABSTRACT OF THE DISCLOSURE

Reaction of sulfur and p-toluidine at elevated temperature and pressure to produce the title product.

---

The present invention relates to a process for the preparation of 2-((4-aminophenyl)-6-methyl-benzothiazole of the formula

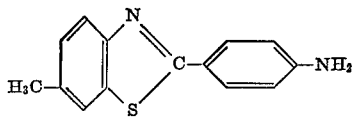

This compound is often called dehydrothio-p-toluidine in the literature. See, for example, Ullmanns Encyklopädie der technischen Chemie (Ullmanns Encyclopedia of Technical Chemistry), third ed., vol. 17 (1966), pp. 333–34.

Dehydrothio-p-toluidine is normally prepared by heating-p-toluidine and sulfur at elevated temperatures. The terminal temperature after 18–20 hours is 220–222° C. From the reaction mass, there is distilled off under vacuum excess p-toluidine. Subsequently, an intermediate cut is taken at temperatures up to 200° C. and then the dehydrothio-p-toluidine is distilled off. Dehydrothio-p-toluidine is obtained in a 57% theoretical yield by recrystallization from hot alcohol, according to the data in Ullmanns Encyclopedia. However, in practice, yields of no more than 55% of the theoretical are achieved.

All prior art processes for preparing dehydrothio-p-toluidine operate discontinuously and without the use of pressure. The ratio of p-toluidine to sulfur employed as starting materials ranges from 2 mol to 4 g-atoms up to 4 mol to 4 g-atoms, i.e., is between the one- to two-fold stoichiometric amount of p-toluidine. The prior art processes are particularly disadvantageous because of the production of large amounts of useless by-products which reduce the yield. Additionally, such processes are batch or discontinuous processes.

The object of the present invention is to provide a process for the preparation of dehydrothio-p-toluidine which not only increases the yield, but is also susceptible to continuous operation.

The process of the present invention prepares 2-(4-aminophenyl)-6-methyl-benzothiazole by the reaction of p-toluidine with sulfur at elevated temperatures in excess of 280° C. and up to 550° C. and at elevated pressures. The preferred temperatures are between 300° C. and 450° C. Pressures of at least 28 atmospheres absolute and preferably from 30 to 100 atmospheres absolute are employed, the pressure to be employed for the obtainment of optimum yields requiring to be beyond the p-toluidine steam pressure.

For the achievement of a high yield of dehydrothio-p-toluidine, one may use 5 to 15 mol p-toluidine related to 4 g-atoms sulfur. The ratio of p-toluidine to sulfur is preferably between 6 to 12 mol per 4 g-atoms.

It is suitable to dissolve the sulfur in p-toluidine prior to the actual reaction. Temperatures of 130–160° C. are advantageous in this connection. During dissolving the sulfur, no reaction or only a very slight one occurs.

The novel process may be carried out in known devices which are suitable for continuous reaction under pressure. For example, an autoclave may be provided with an inlet and an outlet. The preheated p-toluidine with sulfur dissolved therein is then continuously supplied to the autoclave through the inlet. Upon completing the reaction, the entire reaction mixture (liquid and gaseous portion) is removed from the autoclave through the outlet and may be released into a receiver through a pressure-relief valve. It is suitable to divide the autoclave by a vertical baffle plate perforated on top and bottom. The liquid reaction product may then pass through the bottom perforation from the inlet section into the outlet section while the hydrogen sulfide passes through the top perforation. Such reactor is shown in the figure in an exemplary and schematic way.

The figure shows a vertical section of an autoclave 1 being equipped with the screwed-on cover 2 and the heating device 3. The vertical plate 4 which reaches from the cover 2 to the bottom of the autoclave divides the autoclave into two halves, the inlet half 5 and the outlet half 6. At the lower end of the plate 4, near or right at the bottom of the atuoclave, there is a perforation 7 for the melt 8. The melt 8 which consists of the liquid reaction components reaches from the bottom of the autoclave to the liquid level 9. Above the liquid level 9, in the upper part 10 of the reactor there is a space where the gaseous portions are collected. At the upper end, near the cover 2, the plate 4 has a perforation 11 which connects the upper parts of the inlet half 5 and the outlet half 6. The tube 12 through which the feed pump 13 pumps the molten mixture of p-toluidine and sulfur into the reactor, opens out above the liquid level 9 into the inlet half 5. The tube 14 which begins at the liquid level leads from the outlet half 6 to the outside. The reaction mixture which is discharged through the tube 14 is released to the outside by means of the relief valve 15.

The heating device 3 may be operated electrically. Devices for melting the sulfur, supplying the p-toluidine and working up the reaction product as well as measuring and regulating devices, for instance for controlling and regulating the pressure and temperatures in the reactor are not illustrated in the figure. Any devices known for these purposes may be used.

The molten mixture of p-toluidine and sulfur is pumped by means of the feed pump 13 via the tube 12 into the inlet half 5 of the autoclave 1. The melt is heated with the aid of the heating device 3 to the temperature required for this reaction. The liquid reaction product which forms the melt 8 flows from the upper part of the inlet half 5 of the reactor 1 to its bottom and passes near the bottom of the reactor through the perforation 7 of the plate 4 to the outlet half 6 of the reactor. Then the melt 8 flows from the top to the bottom of the outlet half 6. Gaseous reaction products, in the main hydrogen sulfide, are collected in the upper part 10 of the reactor. The gaseous and liquid reactants which leave the reactor through the tube 14 are released by means of a relief valve and worked up, for instance by distillation of the liquid portion.

A particular function of the plate 4 consists in that it extends the way of the reaction mixture in the reactor and prevents the molten initial components which are pumped into the reactor through the tube 12 from leaving the reactor by the shortest way, i.e. via the connection between the outlets of tubes 12 and 14 without having completely reacted.

The novel process of the present invention may also be carried out in other apparatus such as tube reactors.

The residence time in the reactor varies from about 1 to about 20 minutes, preferably from 1 to 7 minutes. The higher the temperature, the shorter the residence time.

Upon pressure release of the reaction mixture, the excess p-toluidine and the dehydrothio-p-toluidine are isolated in a known manner. The recovered p-toluidine may be reused.

The invention is further illustrated by the following examples:

EXAMPLE 1

An autoclave having a total volume of 0.7 l. and divided into an inlet half and an outlet half by a vertical plate perforated at top and bottom is employed as the reaction vessel, as is illustrated in the figure of the attached drawing. In the outlet half there is arranged a drain for the liquid and the gaseous reaction portion in such a manner that a maximum of 400 ml. liquid may be contained in the reaction vessel during reaction.

Sulfur (856 g.) is dissolved in 5000 g. p-toluidine at 150° C. and conducted by means of a plunger pump continuously into the reaction vessel through the inlet of the inlet half of the autoclave. The reaction temperature is 330° C. The pressure is 30 atmospheres absolute.

The liquid reaction portion is transferred through the bottom perforation and the hydrogen sulfide is transferred through the top perforation of the vertical plate into the outlet half of the autoclave from which the liquid and gaseous reaction constituents are continuously drawn off through the outlet and are released into a receiver by means of a regulating valve. A device for the collection of the gas is subsequently added to the receiver.

Following introduction of the reactants (about after 1½ hours which corresponds to an average stay of 7 minutes in the reactor) and the cooling of the autoclave, the content of the autoclave is added to the remaining reaction mixture. Unconverted p-toluidine (3620 g.) is recovered by distillation under reduced pressure. The residue is a raw product (1530 g.) which according to chromatographic analysis contains 979 g. 2-(4-aminophenyl)-6-methyl-benzothiazole. This corresponds to a yield of 63.2% of the theoretical.

EXAMPLE 2

In the apparatus described in Example 1, 5000 g. p-toluidine and 599 g. sulfur are reacted at 390° C., 40 atmospheres absolute pressure and an average residence time of 4 minutes. The degassed reaction mixture (5164 g.) is first distilled in a vacuum of about 20 torr, and p-toluidine (3950 g.) is recovered. The raw product (1205 g.) remaining as residue is subjected to a further distillation wherein 2-(4-aminophenyl)-6-methyl-benzothiazole passes over as the main component (B.P. 215°–238° C.). This fraction (melt. pt. 188°–190° C.) is pulverized and extracted with alcohol. After drying, 821 g. (69.7% of the theoretical) of dehydrothio-p-toluidine is obtained as a light yellow powder having a melting point of 191°–193° C.

EXAMPLE 3

A solution of 110 kg. p-toluidine and 13.2 kg. sulfur is continuously introduced from the bottom into an electrically heated, inclined reaction tube of 1 cm. diameter and 12 m. length, in about 4 hours. The heating is so regulated that the temperature at the upper end of the tube is maintained at 420° C. The pressure is maintained at 42 atmospheres absolute pressure. The initial work-up of the entire reaction mixture is as described above and yields 89.5 kg. of regenerated p-toluidine and 23.1 kg. raw product. According to chromatographic analysis, it contains 17.7 kg. dehydrothio-p-toluidine (76.9% of the theoretical). In the final work-up, 17.4 kg. (75.5% of the theoretical dehydrothio-p-toluidine is obtained.

EXAMPLE 4

In the tube reactor of Example 3, 300 kg. p-toluidine and 18 kg. sulfur are reacted at 330° C., 70 atmospheres absolute pressure and a time of stay of 1.9 minutes. From the reaction mixture (303 kg.), 270 kg. p-toluidine and 33.2 kg. raw product are obtained in the manner previously described. According to chromatographic analysis, the raw product contains 21.6 kg. dehydrothio-p-toluidine 64.3% of the theoretical).

EXAMPLE 5

In a repetition of Example 4, a reaction temperature of 450° C., a pressure of 80 atmospheres absolute pressure and a time of stay of 1.9 minutes are employed. Obtained are 302 kg. of reaction mixture. The initial work-up yields 267 kg. recovered p-toluidine and 35.4 kg. raw product, which according to chromatographic analysis contains 24.9 kg. dehydrothio-p-toluidine (67.3% of the theoretical).

The chromatographic analysis methioned in the examples was carried out according to the methods of thin-layer chromatography on silica gel with methylene chloride as the solvent front. The identified dehydrothio-p-toluidine was extracted with acetone and the content was determined by extinction measurement in UV.

In the final work-up of the raw product, yields of dehydrothio-p-toluidine are obtained which are below the yields obtained chromatographically by about 1–2%.

What is claimed is:

1. A process for preparing 2 - (4 - aminophenyl)-6-methyl-benzothiazole which comprises reacting a mixture of p-toluidine and sulfur in a ratio of p-toluidine to sulfur of between 5 to 15 mols p-toluidine to 4 g.-atoms sulfur at a temperature in excess of 280° C. and up to 550° C. at a pressure of at least 28 atmospheres absolute.

2. The process of claim 1 wherein said temperature is between 300 and 450° C.

3. The process of claim 1 wherein said pressure is from 30 to 100 atmospheres absolute.

4. The process of claim 1 wherein said ratio is between 6 to 12 mols p-toluidine per 4 g.-atoms sulfur.

5. The process of claim 1 wherein said sulfur is dissolved in said p-toluidine at a temperature of 130–160° C. prior to said reaction.

6. The process of claim 1 wherein said reaction is carried out from about 1 to about 20 minutes.

7. The process of claim 1 wherein said reaction is carried out from about 1 to about 7 minutes.

References Cited

UNITED STATES PATENTS

| | | | |
|---|---|---|---|
| 1,149,582 | 8/1915 | Huismann | 260—304 |
| 1,594,866 | 8/1926 | Zitscher | 260—304 |
| 2,037,448 | 4/1936 | Allemann | 260—304 |

RICHARD J. GALLAGHER, Primary Examiner